US009981874B2

(12) United States Patent
Meyer et al.

(10) Patent No.: US 9,981,874 B2
(45) Date of Patent: May 29, 2018

(54) O/W WAX DISPERSIONS AND GYPSUM PRODUCTS OBTAINABLE FROM THESE

(71) Applicants: Gernot Meyer, Rosengarten (DE); Thomas Haas, Winsen (DE)

(72) Inventors: Gernot Meyer, Rosengarten (DE); Thomas Haas, Winsen (DE)

(73) Assignee: Sasol Wax GmbH, Hamburg (DE)

( * ) Notice: Subject to any disclaimer, the term of this patent is extended or adjusted under 35 U.S.C. 154(b) by 743 days.

(21) Appl. No.: 14/274,274

(22) Filed: May 9, 2014

(65) Prior Publication Data

US 2014/0245928 A1 Sep. 4, 2014

Related U.S. Application Data

(60) Division of application No. 13/644,560, filed on Oct. 4, 2012, now Pat. No. 8,741,056, which is a continuation of application No. 11/989,259, filed as application No. PCT/DE2006/001293 on Jul. 25, 2006, now abandoned.

(30) Foreign Application Priority Data

Jul. 26, 2005 (DE) .................. 10 2005 035 515

(51) Int. Cl.
| | | |
|---|---|---|
| C08L 91/00 | (2006.01) | |
| C04B 16/00 | (2006.01) | |
| C04B 24/00 | (2006.01) | |
| C04B 24/26 | (2006.01) | |
| C04B 16/02 | (2006.01) | |
| C04B 24/08 | (2006.01) | |
| C04B 24/34 | (2006.01) | |
| C04B 28/14 | (2006.01) | |
| C08L 91/06 | (2006.01) | |
| C08L 91/08 | (2006.01) | |
| C04B 111/10 | (2006.01) | |
| C04B 103/65 | (2006.01) | |
| C04B 111/27 | (2006.01) | |

(52) U.S. Cl.
CPC ............ *C04B 16/00* (2013.01); *C04B 16/02* (2013.01); *C04B 24/00* (2013.01); *C04B 24/08* (2013.01); *C04B 24/2611* (2013.01); *C04B 24/34* (2013.01); *C04B 28/14* (2013.01); *C08L 91/06* (2013.01); *C08L 91/08* (2013.01); *C04B 2103/65* (2013.01); *C04B 2111/1006* (2013.01); *C04B 2111/27* (2013.01); *C08L 91/00* (2013.01); *C08L 2205/02* (2013.01); *C08L 2205/03* (2013.01)

(58) Field of Classification Search
CPC ......... C08L 91/00; C08L 91/06; C08L 91/08; C08L 2205/02; C04B 16/00; C04B 16/02; C04B 24/00; C04B 24/08; C04B 24/2611; C04B 2111/27; C04B 2111/1006; C04B 2103/65

See application file for complete search history.

(56) References Cited

U.S. PATENT DOCUMENTS

| | | | |
|---|---|---|---|
| 2,198,776 A | 4/1940 | King et al. | |
| 2,432,963 A | 12/1947 | Camp | |
| 2,604,411 A | 7/1952 | Riddell et al. | |
| 3,649,319 A | 3/1972 | Smith | |
| 3,935,021 A | 1/1976 | Greve et al. | |
| 4,042,409 A | 8/1977 | Terada et al. | |
| 4,094,694 A | 6/1978 | Long | |
| 4,140,536 A | 2/1979 | Maier et al. | |
| 4,350,736 A | 9/1982 | Reily | |
| 4,421,704 A | 12/1983 | Reily | |
| 4,675,022 A | 6/1987 | Danner | |
| 4,748,196 A | 5/1988 | Kuroda et al. | |
| 5,098,943 A | 3/1992 | Tagawa et al. | |
| 5,120,355 A | 6/1992 | Imai | |
| 5,437,722 A | 8/1995 | Borenstein | |
| 5,437,772 A * | 8/1995 | De Castro | G01N 27/42 204/400 |
| 5,695,553 A | 12/1997 | Claret | |
| 5,723,137 A * | 3/1998 | Wahle | A61K 8/068 424/401 |
| 5,968,237 A * | 10/1999 | Sinnige | C08L 91/06 106/2 |
| 6,585,820 B2 * | 7/2003 | Wantling | C04B 28/14 106/271 |
| 6,595,553 B2 | 7/2003 | Medici et al. | |
| 6,890,976 B2 * | 5/2005 | Sinnige | C04B 24/2664 524/275 |
| 7,294,189 B2 * | 11/2007 | Wantling | B01F 17/0028 106/164.3 |
| 7,374,610 B2 | 5/2008 | Wantling | |
| 7,488,383 B2 * | 2/2009 | Donlon | C04B 28/14 106/772 |

(Continued)

FOREIGN PATENT DOCUMENTS

| | | |
|---|---|---|
| DE | 229106 | 10/1982 |
| DE | 3519337 | 12/1985 |
| DE | 4337030 | 5/1995 |
| GB | 2081242 | 2/1982 |
| GB | 2081733 | 2/1982 |
| GB | 2205562 | 12/1988 |
| JP | 61-42572 | 3/1986 |
| WO | WO 98/09925 | 3/1998 |
| WO | WO 02/098816 | 12/2002 |

OTHER PUBLICATIONS

AM WA, "Mwax" downloaded Oct. 12, 2017 ICP:09020050.*
Wei et al, "Montan wax: The state-of-the-art review", Journal of Chemical and Pharmaceutical Research, (2014) 6(6):1230-1236.*

*Primary Examiner* — David M Brunsman
(74) *Attorney, Agent, or Firm* — Bushman Werner, P.C.

(57) ABSTRACT

The invention relates to O/W wax dispersions based on water, an emulsifier and a wax phase containing predominantly aliphatic hydrocarbons and polar compounds having chain lengths of at least 18 carbon atoms, and also plaster compositions comprising the O/W wax dispersion, and the use of the O/W wax dispersion.

13 Claims, 1 Drawing Sheet

(56) References Cited

U.S. PATENT DOCUMENTS

| | | |
|---|---|---|
| 7,892,472 B2 | 2/2011 | Veeramasuneni et al. |
| 8,398,764 B2 | 3/2013 | Mahoney et al. |
| 8,663,385 B2 * | 3/2014 | Shoshani ................ C04B 28/14 106/271 |
| 8,680,181 B2 * | 3/2014 | Aberle .................. C04B 28/021 106/500 |
| 8,741,056 B2 * | 6/2014 | Meyer ..................... C04B 24/08 106/271 |
| 8,821,632 B2 * | 9/2014 | Stuart ..................... C04B 28/14 106/231 |
| 8,834,623 B2 * | 9/2014 | Shoshani ................ C04B 28/14 106/164.6 |
| 2006/0009535 A1 * | 1/2006 | Wantling ............ B01F 17/0028 516/43 |
| 2006/0283356 A1 * | 12/2006 | Donlon ................. C04B 28/14 106/660 |
| 2009/0194004 A1 | 8/2009 | Meyer et al. |
| 2010/0152347 A1 | 6/2010 | Mahoney et al. |

\* cited by examiner

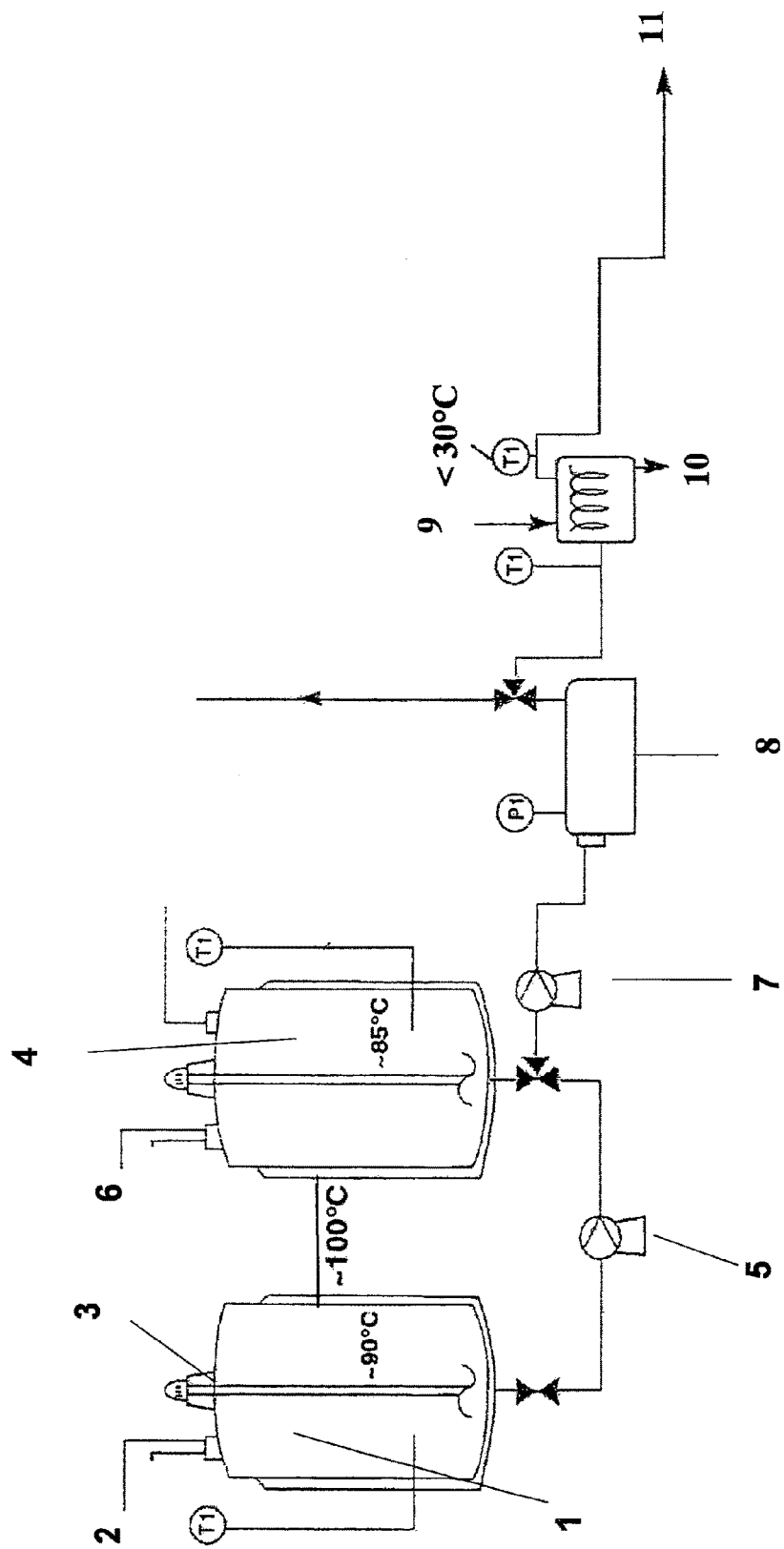

O/W WAX DISPERSIONS AND GYPSUM PRODUCTS OBTAINABLE FROM THESE

CROSS-REFERENCE TO RELATED APPLICATIONS

This application is a divisional of U.S. application Ser. No. 13/644,560, filed Oct. 4, 2012, now U.S. Pat. No. 8,749,056, which is a continuation of U.S. application Ser. No. 11/989,259 filed on Feb. 12, 2009, now abandoned which is a U.S. national phase of PCT/DE2006/001293 filed on Jul. 25, 2006, which claims priority to DE 102005035515.3 filed on Jul. 26, 2005, the disclosures of which are all incorporated herein by reference for all purposes.

BACKGROUND OF THE INVENTION

The invention relates to aqueous compounds containing waxes and gypsum products that can be manufactured from these, particularly aerated gypsum and plasterboard.

Gypsum is calcium sulphate that can be present with and without crystallisation water. Naturally occurring gypsum rock is calcium sulphate dihydrate ($CaSO_4 \times 2H_2O$); the anhydrous form of calcium sulphate is frequently referred to as anhydrite ($CaSO_4$). In the language of this application, "gypsum" refers to naturally occurring gypsum rock, the corresponding products of industrial processes and also the products obtained during the burning of these raw materials.

Gypsum is ideally suited as a construction and working material, due to the fact that it is easy to dehydrate (dehydration (1)). Dehydration is a reversible process. Exposure to energy drives some or all of the crystallisation water out of the calcium sulphate dihydrate. The reverse reaction after water is added (rehydration (2)) causes the previously burned, i.e. at least partially dehydrated gypsum, to become solid, forming a crystalline structure.

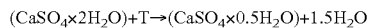

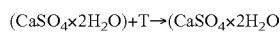

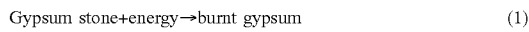 (1)

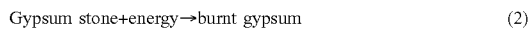 (2)

Naturally occurring gypsum varies in terms of its purity. Natural impurities include, e.g. limestone (e.g. muscovite or dolomite $CaCO_3 \times MgCO_3$), marl, mineral clay (e.g. montmorillonite or caolinite), and occasionally also sand, bitumen or a variety of salts. However, gypsum is also accessible from various technical processes. For example, flue-gas or REA gypsum with a high degree of purity is produced during the desulphurisation of flue gases.

Gypsum plasterboards are industrially manufactured building boards essentially made up of gypsum, the surfaces and possibly also the longitudinal edges of which are surrounded by firmly adhered paperboard to suit the application. The gypsum core surrounded by paperboard may contain air spaces and additives to achieve given properties.

Essential mechanical plasterboard properties result from the combined effect of the gypsum core and the paperboard casing. This involves the paperboard acting to reinforce the tension area, which in conjunction with the gypsum core gives the gypsum plasterboard the required strength and flexural rigidity. Various types of gypsum plasterboard (GKB) are distinguished, e.g. those that include additives to delay water absorption (impregnated gypsum plasterboard (GKBI) and impregnated fire-resistant gypsum plasterboard (GKFI)).

The water absorption and drying-out time of gypsum plaster-board is tested according to DIN 18180 (2 hours' spent in water).

|  | GKB/GKF | GKBI/GKFI |
|---|---|---|
| Water absorption in (w/w) % | 30-50 | <10 |
| Drying-out time in hrs | 70 | 15 |

Gypsum plasterboard is made from gypsum and additives for the gypsum core, as well as high-grade, repeatedly couched paperboard on large belt systems running continuously. Plaster of Paris (low-fired gypsum, produced at temperatures of roughly 120° C. to 180° C.) is frequently used. The production process comprises the following steps:
- paperboard supplied at the bottom,
- gypsum slurry supplied and distributed by the moulding station while paperboard is simultaneously supplied from above to form the top layer,
- hardening section,
- insertion in a dryer (usually after being divided up into individual boards) and
- delivery and possible trimming of the transverse edges and bundling of the boards.

In addition, there are also gypsum building materials in the form of wallboards made from gypsum, which are briefly referred to as "gypsum wallboards". These are factory-made building panels made from plaster of Paris and water for non-weight-bearing structural components. Gypsum wallboards may contain fibres, fillers and additive substances, as well as other additives, and they may be coloured with pigments to distinguish them visually. They have smooth visible surfaces and are designed with alternating tongue and groove finishes on the abutting and storage surfaces. Here, too, water-repellent boards are known.

Board production takes place in largely automated production plants. Uniform, runny slurry is made from plaster of Paris, water and possibly additives in a dosage and mixing apparatus and used to fill the moulding boxes of the gypsum plasterboard machine. Once the mixture has set, the boards are ejected hydraulically and transported to the dryer. This is followed by drying in heated continuous driers. After drying, the boards are combined into packages or loaded onto pallets.

Gypsum fibre boards are furthermore referred to as gypsum-based plasterboard.

The production of gypsum with low bulk densities, particularly so-called foam or aerated gypsum, is the object of many patents and publications. The solutions known hitherto can generally be divided into two groups:

(1) Use of gas formers (propellants), which are added to the binding agent partially dry or are completely or partially added to the latter only during the aerated gypsum production process via the mixing water. The gas formers mainly comprise several material components in which a chemical reaction is activated by the water coupled with the creation of a gas. The resulting gas bubbles force the gypsum slurry up in the mould.

(2) Undermixing of separately prepared foam, which is added to the mixture in the mixer and immediately causes pores to form in the made-up material slurry. Foam is mainly produced by atomising water and air enriched with surface-active substances (surfactants).

It is also known that aerated gypsum elements produced using the aforementioned method are additionally water-repellent. This involves water-repellent additives being added to the mixer in the mixture preparation phase.

Gypsum products, particularly gypsum plasterboard, are provided with additives that delay water absorption, for use in damp areas. The impregnating additives are usually added to the gypsum mixture before the gypsum products are made and worked into it uniformly, after which the gypsum mixtures are usually dried in layers at a high temperature of e.g. 100 to 150° C. and then cooled. If the gypsum boards are covered with paperboard, they are referred to as gypsum plasterboards.

If the gypsum does not receive suitable water-repellent treatment, the effect of dampness can cause the paperboard to soften, leading to deformation. The use of gypsum plasterboard in damp rooms, such as bathrooms, laundry rooms, etc. is therefore problematic due to its diminishing rigidity and deformation. This has particularly serious effects when the gypsum plasterboard has ceramic tiles adhered to it, for example. The dampness causes the paperboard to soften, lose its inner rigidity and split under the weight of the ceramic tiles, causing the layer of paperboard attached to the boards to fall away. The destruction of the remaining gypsum paperboard is then only a matter of time.

In addition to the diminishing rigidity and deformation, corrosion and mildew can accelerate the destruction. Even the adhesive layer applied to the entire surface for the ceramic tiles, which usually has a synthetic base, cannot inhibit the effect of the dampness.

The use of silicon or siloxane emulsions/dispersions for impregnation is known. In addition, dispersions based on paraffin or montan waxes are known. However, polymers and resins are also used, which do not fall into the wax category. Polyvinyl alcohols are referred to as polymers. The wax components are in some cases also added to the gypsum mixture in powder form. Mixtures of asphalt or bitumen dispersions, in some cases used in combination with polyvinyl alcohols, in which a silicon compound or a synthetic resin emulsion has been added to the gypsum, are likewise known from the literature.

However, it is difficult to obtain a satisfactory water-repellent or hydrophobic product, which is sufficiently hydrophobic and, at the same time, facilitates the necessary foam stability to produce an aerated product.

U.S. Pat. No. 3,935,021 describes a gypsum wallboard in which polyvinyl alcohol and a wax-asphalt emulsion are introduced into the gypsum core. Wax-asphalt emulsions are widely used in gypsum wallboards, although certain disadvantages are associated with their use.

In U.S. Pat. No. 5,437,722 an aqueous emulsion is used to make gypsum products water-repellent, which comprises a hydrocarbon wax, a montan wax and an emulsifier/stabiliser system with the addition of polyvinyl alcohol.

WO 98/09925 describes an aerated gypsum product, which is made water-repellent through the inclusion of an aqueous emulsion, which comprises a hydrocarbon wax, a montan wax and a colloid-stabilised emulsifier system.

Other aqueous wax dispersions for making gypsum products water-repellent, which contain starch, long-chain alkyl phenols, saponified montan waxes, surfactant, complexing agents and paraffin waxes are known from U.S. Pat. No. 6,585,820. U.S. Pat. No. 6,595,553 also mentions surfactant, montan wax and paraffin wax as an integral part of the aqueous wax dispersion.

The problem addressed by the present invention is that of finding a water-repelling agent that is suitable for both traditional gypsum plasterboard and also for the technically more complex production of aerated gypsum. A further problem facing the invention is that of guaranteeing sufficient vapour permeability, despite the water-repellent nature. Furthermore, the wax additive must improve the flow performance of the gypsum mixture, bring about a slight change in the reinforcing behaviour of the gypsum, cause a significant improvement in the paperboard adhesion and have a very slight effect on foaming in the process.

The effectiveness of wax dispersions in gypsum products is crucially dependent on the composition. It is obviously important for the internal surface of the micropores to be sealed in the gypsum. On the other hand, the pores must not be completely closed off, in order to retain the desired vapour permeability. This cannot be achieved with pure hydrocarbon dispersions according to our findings. In the past, montan wax was used here in the mixture with paraffin. Montan wax is a hard fossil wax of vegetable origin, which has survived the carbonisation process virtually unchanged. It therefore occurs in some brown coal as an extractable element. Important chemical parameters include the acid number (AN) and saponification number (SN) of the montan wax. Furthermore, a small number of hydrocarbons are contained in montan waxes, but not unsubstantial proportions of montan resins and asphalt substances, whereby the latter contain a not unsubstantial proportion of inorganic ash components (0.4 to 4% by wt.).

Montan resins and ash components may affect the colour if, for example, a particularly light-coloured gypsum is required when the material is used in visible construction work. The hydrocarbon chains in the wax acids and wax alcohols have a chain length of 20 to 34 C units with a maximum of around 30 C units. In this case, the focus lies on chains with a straight-line number of carbon atoms.

When using wax dispersions in impregnated gypsum plasterboard (GKBI) and impregnated fire-resistant gypsum plasterboard (GKFI), it is generally of particular significance that these do not have a negative effect on the paperboard's adhesion to the surface of the gypsum core. Furthermore, the emulsifier systems must also be based on optimum adhesion of the paperboard layer and minimum interference with the foaming behaviour of the gypsum slurry. Surprisingly, it was found that the water-repelling effect in gypsum products known hitherto predominantly from wax dispersions containing montan wax can also be achieved with other specially selected polar synthetic and natural components. Apart from paraffin and in claim 1 obligatory named polar long-chain compounds, longer-chain alphaolefins (hydrated and/or unhydrated) and Fischer-Tropsch waxes can also be used as the basic wax phase. Also capable of being used in the composition are natural waxes, fats, fatty alcohols and synthetic and synthetically modified natural resin components.

It emerged that the desired water-repellence could also be achieved with the help of wax phases without montan wax. In this case, other wax phases and also other polar additives were identified as useable. This produces lighter/whiter gypsum products that can also be used for visible construction, as the wax phases, particularly the additives used, display significantly lower ash contents or none at all and also contain no dark asphalt and resin components.

SUMMARY OF THE INVENTION

The O/W wax dispersion according to the invention for use in gypsum products consist of:

at least 30% by wt., particularly 30 to 80% by wt., preferably around 40 to 65% by wt., water, at least 20% by wt., particularly 70 to 20% by wt., preferably 35 to 60% by wt, wax phase as the disperse phase, wherein the wax phase or the total substances used to create the wax phase (i.e. before further saponification, where appropriate, through optional alkalisation or the alkali/earth alkali addition) display a saponification number greater than 0.2 mg KOH/g, at least 0.1% by wt., particularly 0.5 to 5% by wt., of an emulsifier or thickening agent as the dispersal agent, and maximum 20% by wt., particularly under 10% by wt., other substances, particularly as a component of the continuous phase, wherein the wax phase consists of the following, each based on the wax phase:

(a) 50 to 98% by wt. aliphatic hydrocarbons (HC) or mixtures thereof, each with a solidification point above 50° C. and below 95° C., particularly 55 to 80° C., (b) 2 to below 50% by wt., particularly 5 to 20% by wt., from polar, long-chain compounds with chain lengths of at least 18 carbon atoms, particularly aliphatic, containing
at least one carboxyl group, possibly partially or fully derivated,
an ether group and/or
at least one hydroxyl group (—OH)
per molecule, but no more than three of the aforementioned groups together,
particularly polar, long-chain compounds, which contain per molecule at least one carboxyl group, possibly partially or fully derivated, alongside possibly up to two other groups per molecule, including the carboxyl group, possibly derivated,
and possibly (c) maximum 10% by wt., particularly below 5 and preferably below 0.5% by wt., other substances solid at room temperature, particularly aromatic-free, or none and (d) maximum 3% by wt. substances liquid at room temperature (at room temperature and normal pressure), particularly below 1.5% by wt., wherein the wax phase comprises at least carnauba wax, esterified colophonium-resins and/or beeswax and wherein the wax dispersion has a pH value higher than 11.

BRIEF DESCRIPTION OF DRAWINGS

FIG. 1 is a schematic diagram showing the production of O/W emulsions.

DETAILED DESCRIPTION OF THE PREFERRED EMBODIMENTS

Advantageous embodiments are the subject of the dependent claims or are described below. Also claimed are gypsum compositions, as described above, containing wax dispersions and the use of wax dispersions in such gypsum compounds or else the gypsum products described above.

Substances that can be used as aliphatic hydrocarbons according to the invention are paraffin, synthetic Fischer-Tropsch waxes and alphaolefins (AO, hydrated and unhydrated) with a solidification point of over 50° C. and below 95° C. and, particularly, with average C chain lengths greater than 25 in each case.

Polar compounds within the meaning of the present invention are compounds displaying hydrocarbon chains with per molecule over 18 C atoms and at least one hydroxyl group, an ether group and/or a carboxyl group (—C(=O)O—), possibly also derivated, i.e. esterified or saponified. The polar compounds display no more than three of the aforementioned groups or a total of three polar groups, particularly one or two groups, per molecule overall.

The further polar compounds may be oxidised and possibly also partially saponified Fisher-Tropsch waxes, oxidised paraffin, oxidised polyethylene, so-called PE wax esters (jointly referred to as oxidised hydrocarbons (HC) or partially saponified oxidised HC's) and modified natural and/or synthetic resins, as well as natural waxes. Furthermore, fats (triglycerides), e.g. of vegetable origin, such as palm, soya and rapeseed fats, are suitable. The acid groups contained in the polar additives may be saponified during the course of the wax dispersion production with the aid of alkaline substances (e.g. potassium or caustic soda). These lyes are overdosed in this case, so that pH values of over 11 are obtained. This also has a favourable effect on the resistance of the wax dispersions to biological decomposition and mildew. The Wax dispersion comprises esterified colophonium resins such as glycerine and/or pentaerythrite maleic acid colophonium resins, beeswax and/or carnauba wax, wherein the colophonium-resins preferably are used in combination, particularly with oxidised HC's and/or partially saponified oxidised HC's.

It is particularly preferable for the wax dispersion to contain carnauba wax as a constituent part of the polar compounds, particularly at 1 to 20% by wt., particularly 1 to 15% by wt., relative to the wax phase.

Particularly advantageous are mixtures of polar compounds, which contain as polar compounds the above oxidised hydrocarbons (HC) or partially saponified, oxidised HC's (greater than 1% by wt.) and carnauba wax (greater than 1% by wt.) or the above oxidised hydrocarbons (HC) or partially saponified, oxidised HC's (greater than 1% by wt.) and the above synthetically modified colophonium resins. The percentages by weight each relate to the wax phase (=100% by wt.).

The water-repellent effect is reinforced if the polar compounds contain as the predominant constituent part oxidised and possibly also partially saponified Fischer-Tropsch waxes, oxidised paraffin, oxidised polyethylene, so-called PE waxes and, as the lesser component, fats (e.g. palm fats or soya oils) and/or fatty alcohols (e.g. Nafol® 20+). This produces synergistic effects. In other words, the reduction in water absorption when additives are combined increases even more than can be expected from the sum of the individual effects.

In this case, the wax phase is preferably added to the gypsum slurry in the form of an aqueous wax dispersion, as gypsum board production is water-based and the dosing of the wax phase can therefore be significantly more accurate. Furthermore, the preferably small particle size of the disperse wax phase (average particle size less than 2 μm and particularly roughly 1 μm) ensures a particularly uniform distribution of the active substance in the gypsum slurry.

In principle, all types used for the production of wax dispersions, i.e. non-ionic, anionic and cationic emulsifier types, but also combinations of these (non-ionic with anionic and non-ionic with cationic) are suitable as emulsifiers. Non-ionic and anionic emulsifiers are particularly suitable. Furthermore, emulsifiers that achieve stabilisation by concentrating the water phase are also suitable. These may be natural resins, for example, (Gum Ghatti, derivated cellulose) or xanthane polymers or else polysaccharide, but also inorganic substances of the bentonite type. Particularly suitable as emulsifiers are sulphonates such as naphthaline sulphonate and/or lignin sulphonate, preferably along with a thickening agent such as Gum Ghatti, in particular.

Furthermore, polyvinyl alcohols may be added to the wax dispersion, particularly up to 0.5 to 4% by wt. relative to the wax dispersion, which are available, for example, as partially hydrolised ethylene vinyl acetate polymers, but also produced from acrylates and other polyvinyl esters. Degrees of hydrolysis of over 70%, particularly over 85%, are desirable, but not a requirement.

The compositions according to the invention are advantageously wax dispersions, which can be produced with the aid of homogenisers. In this case, at least two phases are combined with one another (pre-emulsion).

At least the wax-containing phase is heated above the solidification point for this, in order to melt the wax. The other phase is the aqueous phase. This is preferably mixed with the emulsifier and is advantageously heated likewise.

The pre-emulsion is then passed through the circuit e.g. via splitting homogenisers, until the desired particle size of the wax phase is achieved. The emulsion is then cooled to temperatures below the solidification point of the wax phase. The individual wax particles of the disperse phase are evenly distributed in the aqueous, continuous phase by the process and a wax dispersion with prolonged stability is thereby obtained. The wax dispersion is thereby created. This is an oil in water (O/W) wax suspension with an average particle diameter of particularly 0.1 to 10 μm, advantageously 0.5 to 2 μm. The wax dispersion according to the invention is particularly suitable for the production of the water-repellent gypsum compositions described above, particularly those containing or comprising foamed gypsum or aerated gypsum and, in particular, coated gypsum plasterboard, preferably using the aforementioned gypsum.

FIG. 1 shows how the O/W emulsions are typically produced. In a wax boiler (1) fitted with a temperature sensor and temperature monitoring system, the wax emulsifier (2), water and hot steam (3) are produced, agitated and moved into the pre-emulsion boiler (4) by means of a pump (5), where the water-emulsifier mixture (6) is added. Delivery and transfer into the homogeniser (8) takes place using the pump (7). By means of a cooling medium (9), the temperature of the emulsion is lowered in the cooling system (10), e.g. to 30° C., in order to obtain the finished wax dispersion (11).

Experiments

The degree of water repellence can be determined by subjecting the gypsum body to an immersion test. This involves the water absorption being determined in % by wt. after a 120 minute immersion period ($H_2O$ 120 mins column in the following table). Suitable threshold values in this case are <10% by wt. and, particularly, <5% by wt. water absorption.

Table 1 shows the data for the finished wax phases (% stands for % by wt. in each case). It emerges that predominantly hard wax phases (needle penetration at 25° C.<20 [0.1 mm] in accordance with ASTM D1321) with solidification points of between 60 and 80° C. and also acid numbers (DIN 51558) of between 0 and 10 (mg KOH/g) and also saponification numbers from 0 to 20 mg KOH/g have a beneficial effect on water repellence. This produces the values required by DIN 18180 of <10% by wt. water absorption. The water absorption is therefore significantly reduced compared with the blind value (31%) of the natural gypsum used in this case, which demonstrates the effect of the wax mixtures used as wax dispersions. The wax dispersions (WD) were made according to the following suggested formulation:

60% by wt. water; 3% by wt. Marlophen® NP 10 (non-ionic surfactant from Sasol Olefins and Surfactants GmbH on an ethoxylate base); 1% by wt. KOH (45% by wt.) and 36% wax phase.

Laboratory Production of the Wax Dispersion:

The water was heated to approx. 80° C. along with the surfactant and the KOH and agitated for roughly 20 mins. The molten (80-100° C.) wax phase was then added and agitated for a further 5 minutes. The pre-emulsion was added to the homogeniser and passed through the circuit for 1 minute, after which it was homogenised for 1 minute at a pressure of roughly 200 bar. The wax emulsion was then cooled to room temperature during which the wax particles solidified and the wax dispersion was produced.

TABLE 2

Substances used

| Name | Type | Manufacturer |
|---|---|---|
| Paraffin | Sasolwax 6403 (Fully Paraffin) EP 64/66 | Sasol Wax GmbH |
| Carnauba wax | Natural palm wax | Kahl & Co |
| Resin | Escorez 1102 F, aliphatic hydrocarbon resin | Exxon Mobil |

TABLE 1

Properties of different wax dispersions

| No. | Data Composition Dispersion/unit | EP (° C.) | PenN25 (1) (0.1 mm) | AN (2) (mgKOH/g) | SN (3) | Foam reduction (4) | $H_2O$ 120 min (5) | Paper adhesion (6) (% by wt.) | Start of hardening (6) Min | End of hardening (6) | Flow measure (6) (*) |
|---|---|---|---|---|---|---|---|---|---|---|---|
| * | Gypsum blind value | | | | | | 31 | = | 6 | 9 | = |
| V1** | Montan wax/paraffin | 70.5 | 10 | 3 | 8.7 | = | 2.4 | + | +2 | +4 | Higher |
| V2** | Montan wax/paraffin | 64.5 | 11 | 3.1 | 9 | = | 2.5 | + | +2 | +4 | Higher |
| 1 | Carnauba wax/paraffin (2.5% carnauba) | 66 | 16 | 0.3 | 1.4 | = | 2.3 | + | = | +4 | Higher |
| 2 | Carnauba wax/paraffin (5% carnauba) | 65 | 11 | 0.5 | 4.1 | Smaller | 4.6 | + | +2 | +2 | = |

TABLE 1-continued

Properties of different wax dispersions

| No. | Data Composition Dispersion/unit | EP (° C.) | PenN25 (1) (0.1 mm) | AN (2) (mgKOH/g) | SN (3) (mgKOH/g) | Foam reduction (4) | H₂O 120 min (5) | Paper adhesion (6) (% by wt.) | Start of hardening (6) Min | End of hardening (6) Min | Flow measure (6) (*) |
|---|---|---|---|---|---|---|---|---|---|---|---|
| 3 | Carnauba wax/resin/paraffin (10% carnauba, 5% escorez) | 67 | 11 | 1 | 8.2 | = | 3.6 | + | = | +4 | Thicker |
| 4 | Carnauba wax/paraffin (10% carnauba wax) | 66 | 19 | 1 | 8.2 | — | 6 | — | — | — | — |

Key to Table 1
(*) Blind value of the untreated natural gypsum 31%
(**) These two dispersions serve for comparison purposes with the state of the art
(1) Solidification point ASTM D 938
(2) Needle penetration ASTM D 1321 at 25° C.
(3) Acid number according to DIN 51558
(4) Saponification number according to DIN 51559
(5) Water absorption according to DIN 81180
(6) Internal house methods
+ better than blind value (possibly better than gypsum value by how much)
= equal to blind value
— not measured

What is claimed is:

1. A gypsum composition with an O/W wax dispersion added, the O/W wax dispersion comprising:
   at least 30% by wt. water,
   at least 20% by wt. wax phase as the disperse phase, wherein the wax phase has a saponification number greater than 0.2 mg KOH/g,
   at least 0.1% by wt. of an emulsifier or thickening agent as dispersing adjuvant, and
   wherein the wax phase comprises the following, based on the wax phase:
   50 to 98% by wt. aliphatic hydrocarbons (HC) or mixtures thereof, each with a solidification point above 50° C. and below 95° C.,
   2 to below 50% by wt. of one or more polar, long-chain compounds with at least 18 carbon atoms selected from the group of oxidized Fischer-Tropsch waxes, oxidized paraffins, oxidized polyethylene, and mixtures thereof,
   wherein the gypsum composition comprises greater than 50% by wt. of calcium sulphate dehydrate and 0.1 to 5% by wt. of the wax phase of the O/W wax dispersion.

2. The gypsum composition according to claim 1, characterized in that the proportion of HCs being linear is greater than 50% by wt.

3. The gypsum composition according to claim 2, wherein the degree of linearity of the HCs is greater than 65% by wt.

4. The gypsum composition according to claim 1, characterized in that the wax dispersion has a pH value of 11 to 13.

5. The gypsum composition according to claim 1, characterized in that the wax phase contains under 0.2% by wt. substituted phenols.

6. The gypsum composition according to claim 1, characterized in that the wax dispersion comprises from 0.5 to 4% by wt. of at least one of polyvinyl alcohols and partially hydrolysed polyvinyl alcohols.

7. The gypsum composition according to claim 1, characterized in that the wax dispersion was added to a gypsum slurry to form the gypsum composition.

8. An O/W wax dispersion comprising:
   at least 30% by wt. water,
   at least 20% by wt. wax phase as the disperse phase, wherein the wax phase has a saponification number greater than 0.2 mg KOH/g,
   at least 0.1% by wt. of an emulsifier or thickening agent as dispersing adjuvant, and
   wherein the wax phase comprises the following, based on the wax phase:
   50 to 98% by wt. aliphatic hydrocarbons (HC) or mixtures thereof, each with a solidification point above 50° C. and below 95° C.,
   2 to below 50% by wt. of one or more polar, long-chain compounds with at least 18 carbon atoms selected from the group of oxidized Fischer-Tropsch waxes, oxidized paraffins, oxidized polyethylene, and mixtures thereof.

9. The wax dispersion according to claim 8, characterized in that the proportion of HCs being linear is greater than 50% by wt.

10. The wax dispersion according to claim 9, wherein the degree of linearity of the HCs is greater than 65% by wt.

11. The wax dispersion according to claim 8, characterized in that the wax dispersion has a pH value of 11 to 13.

12. The wax dispersion according to claim 8, characterized in that the wax phase contains under 0.2% by wt. substituted phenols.

13. The wax dispersion according to claim 8, characterized in that the wax dispersion comprises from 0.5 to 4% by wt. of at least one of polyvinyl alcohols and partially hydrolysed polyvinyl alcohols.

* * * * *